United States Patent
Lau et al.

(10) Patent No.: US 9,667,076 B2
(45) Date of Patent: May 30, 2017

(54) STANDBY BATTERY PRODUCT AND STACKABLE CHARGING SYSTEM THEREOF

(71) Applicant: Sun Pleasure Company Limited, San Po Kong, Kowloon (HK)

(72) Inventors: Vincent W. S. Lau, Kowloon (HK); Lei Zheng, Kowloon (HK)

(73) Assignee: Sun Pleasure Company Limited, Hong Kong (HK)

( * ) Notice: Subject to any disclaimer, the term of this patent is extended or adjusted under 35 U.S.C. 154(b) by 222 days.

(21) Appl. No.: 14/297,281

(22) Filed: Jun. 5, 2014

(65) Prior Publication Data

US 2015/0008870 A1    Jan. 8, 2015

(30) Foreign Application Priority Data

Jul. 3, 2013    (CN) .................... 2013 2 0393689 U

(51) Int. Cl.
| | |
|---|---|
| *H02J 7/00* | (2006.01) |
| *H01M 10/46* | (2006.01) |
| *H01M 4/587* | (2010.01) |

(52) U.S. Cl.
CPC ........... *H02J 7/0042* (2013.01); *H01M 4/587* (2013.01); *H01M 10/46* (2013.01); *H02J 7/0045* (2013.01); *H01M 2220/30* (2013.01)

(58) Field of Classification Search
CPC ...... H02J 7/0042; H02J 7/0045; H01M 4/587; H01M 10/46; H01M 2220/30
See application file for complete search history.

(56) References Cited

U.S. PATENT DOCUMENTS

| | | | |
|---|---|---|---|
| 3,696,283 A | 10/1972 | Ackley | |
| 5,030,902 A * | 7/1991 | Mattinger | ............. B26B 19/286 30/DIG. 1 |
| 5,382,167 A * | 1/1995 | Janson, Jr. | ............ E05C 19/165 439/38 |
| 5,814,968 A | 9/1998 | Lovegreen | |

(Continued)

OTHER PUBLICATIONS

Atomic Group (www.atomicgp.com): "ExoGear ExoVolt Plus" YouTube video document.

(Continued)

*Primary Examiner* — Naum B Levin
(74) *Attorney, Agent, or Firm* — Raymond Sun

(57) ABSTRACT

An electrical charging system includes a charging socket and a standby battery product. The charging socket has a socket casing, and a power input interface on the socket casing and electrically connected to a first conductive contact that extends above the socket casing. The standby battery product has a battery casing with a battery housed inside the battery casing, the battery casing further including a conductive pin and a second conductive contact, with the conductive pin and second conductive contact electrically connected to the battery. When the battery casing is placed on top of the socket casing, the conductive pin is aligned with, and contacts, the first conductive contact, creating a charging path that is defined by the power input interface (which receives external power), the first conductive contact of the socket casing, the conductive pin of the battery casing, and the electricity storage unit of the battery product.

2 Claims, 3 Drawing Sheets

(56) References Cited

U.S. PATENT DOCUMENTS

| | | | | | |
|---|---|---|---|---|---|
| 6,327,152 | B1* | 12/2001 | Saye | G06F 1/1626 | 361/679.4 |
| 7,079,862 | B2* | 7/2006 | Chien | G08B 21/24 | 455/403 |
| 7,291,422 | B2* | 11/2007 | Oogami | H01M 2/206 | 429/152 |
| 7,499,282 | B1* | 3/2009 | Loucks | G06F 1/1626 | 361/730 |
| 7,589,496 | B2* | 9/2009 | Chatterjee | G06F 3/03543 | 320/114 |
| 7,762,817 | B2* | 7/2010 | Ligtenberg | H01R 13/74 | 439/38 |
| 7,777,448 | B2* | 8/2010 | Beghelli | H02J 7/0013 | 320/112 |
| 8,242,744 | B2* | 8/2012 | Matsuoka | H02J 7/0027 | 30/34.1 |
| 8,300,389 | B2* | 10/2012 | Kang | H04M 1/0254 | 361/679.01 |
| 8,410,753 | B2* | 4/2013 | Opolka | H01R 13/22 | 320/111 |
| 8,755,851 | B2* | 6/2014 | Kim | H04M 1/0274 | 455/572 |
| 9,153,983 | B2* | 10/2015 | Sakai | H02J 7/0042 | |
| 9,190,782 | B2* | 11/2015 | King | H01R 13/713 | |
| 2005/0116684 | A1* | 6/2005 | Kim | B60R 11/0241 | 320/114 |
| 2007/0208892 | A1* | 9/2007 | Betts-LaCroix | G06F 1/16 | 710/62 |
| 2009/0015195 | A1* | 1/2009 | Loth-Krausser | H01M 10/46 | 320/107 |
| 2010/0181965 | A1* | 7/2010 | Matsuoka | H02J 7/0027 | 320/115 |
| 2010/0194337 | A1* | 8/2010 | Opolka | H01R 13/22 | 320/114 |
| 2012/0329532 | A1* | 12/2012 | Ko | H04B 1/3888 | 455/573 |
| 2013/0043826 | A1* | 2/2013 | Workman | H01M 2/0245 | 320/101 |
| 2013/0069583 | A1 | 3/2013 | Lemelman | | |
| 2014/0117921 | A1* | 5/2014 | Suomela | H04B 5/0031 | 320/103 |

OTHER PUBLICATIONS

Aug. 30, 2012, XP054975493, Retrieved from the Internet: URL:https://www.youtube.com/watch?feature=player_detailpage&v=kGxSQBNORgU (retrieved on Aug. 26, 2014)—the whole document.

European Search Report in EP14173907.

* cited by examiner

STANDBY BATTERY PRODUCT AND STACKABLE CHARGING SYSTEM THEREOF

BACKGROUND OF THE INVENTION

Field of the Invention

The present invention relates to the technical field of maintenance of secondary batteries or secondary battery devices, and in particular, to a standby battery product and a stackable charging system for charging a standby battery product.

Description of the Prior Art

The existing standby battery products, which are normally referred to as "portable power supplies" and also as "mobile batteries", "external batteries", "backup batteries", "digital charging partners", "charging bars", " portable chargeable power supplies", "portable power packs" and "mini chargers", are portable chargers integrating power supply and charging, and are capable of charging digital devices such as mobile phones anywhere anytime, or supplying power in the standby mode. Generally, the standby battery products use lithium battery cells or dry batteries as the electricity storage units, and are also called external batteries to differentiate them from batteries disposed inside the products. Moreover, with the characteristics of large capacity, multipurpose, small size, long service life and reliability, the existing standby battery products are functional products which can supply power to a variety of digital products such as mobile phones, digital cameras, MP3, MP4, PDA, hand-held computers and hand-held consoles anywhere anytime or charge them in the standby mode.

At present, the most common charging mode for the standby battery products is AC direct charging, charging by an external power supply, wireless charging, solar charging and wind up charging, among others, of which charging by an external power supply is the most common mode, especially for charging by using a USB power supply.

For example, Chinese Utility Model No. CN 200520057049.7 discloses a multifunctional power socket capable of supplying two kinds of DC and AC. The multifunctional power socket mainly comprises a socket casing, electrode contacts disposed inside the power socket, and a socket and a switch mounted on the socket casing. The casing consists of an upper casing and a lower casing. A miniature electronic rectifier is disposed inside the socket casing, and a USB interface is disposed on a side face of the socket. An output end of the miniature electronic rectifier is connected to the USB interface. When the multifunctional power socket provided is for charging a communication device such as mobile phone, the communication device can be directly charged simply by connecting the mobile phone with the USB through a USB line.

Chinese Utility Model No. CN 201220538700.2 discloses a charging socket, comprising a socket and a charging module disposed inside the socket. The charging module comprises a power adapter and multiple USB interfaces connected in parallel. One end of the power adapter is electrically connected to an AC power supply, and the other end thereof is electrically connected to the USB interfaces.

The prior art, represented by the above technical solutions, has the advantage of strong universality, because a charging power supply can be provided as most of the existing digital products use a USB power supply; moreover, most of the personal computers have USB interfaces. However, they are inconvenient use, because each standby battery product must be connected to one USB power supply, and is to be plugged in or pulled out at the beginning and at the end of charging, thereby resulting in poor user experience.

SUMMARY OF THE DISCLOSURE

It is an object of the present invention to provide a standby battery product and a stackable charging system for charging the standby battery product, which enables the battery product to have a direct stackable charging function without any external power supply line, so that it would be able to charge multiple standby batteries at the same time.

In order to accomplish the objects of the present invention, the present invention provides an electrical charging system that can operate using a charging socket and a standby battery product, or can be part of a standby battery product alone.

The charging socket has a socket casing, a power input interface provided on the socket casing and electrically connected to a first conductive contact that extends above the socket casing, and a plurality of first couplers provided on an upper part of the socket casing. The standby battery product has a battery casing with an electricity storage unit housed inside the battery casing, the battery casing further including a conductive pin and a second conductive contact, the conductive pin and second conductive contact being electrically connected to the electricity storage unit, the battery casing further including a plurality of second couplers. When the battery casing is placed on top of the socket casing, the conductive pin is aligned with, and contacts, the first conductive contact, and the first couplers engage the second couplers. This creates a charging path that is defined by the power input interface (which receives external power), the first conductive contact of the socket casing, the conductive pin of the battery casing, and the electricity storage unit of the battery product.

In accordance with another embodiment of the present invention, the present invention provides an electrical charging system that has first and second standby battery products. The first standby battery product has a first battery casing with a first electricity storage unit housed inside the first battery casing, the first battery casing further including a first power input interface on the first battery casing, a first conductive pin and a first conductive contact, the first conductive pin and first conductive contact being electrically connected to the first electricity storage unit and the first power input interface, the first battery casing further including a plurality of first couplers. The second standby battery product has a second battery casing with a second electricity storage unit housed inside the second battery casing, the second battery casing further including a second power input interface on the second battery casing, a second conductive pin and a second conductive contact, the second conductive pin and second conductive contact being electrically connected to the second electricity storage unit and the second power input interface, the second battery casing further including a plurality of second couplers. When the second battery casing is placed on top of the first battery casing in a stacking arrangement, the second conductive pin is aligned with, and contacts, the first conductive contact, and the first couplers engage the second couplers, when the second battery casing is placed on top of the first battery casing. This stacking arrangement creates two charging paths, a first charging path that is defined by the first power input interface of the first battery casing and the first electricity storage unit, and a second charging path that is defined by the first power input interface of the first battery casing, the first conductive contact of the first battery casing, the second conductive pin of the second battery casing, and the second electricity storage unit of the battery product.

DETAILED DESCRIPTION OF THE PREFERRED EMBODIMENTS

The following detailed description is of the best presently contemplated modes of carrying out the invention. This description is not to be taken in a limiting sense, but is made merely for the purpose of illustrating general principles of the invention. The scope of the invention is best defined by the appended claims.

Figure 1:
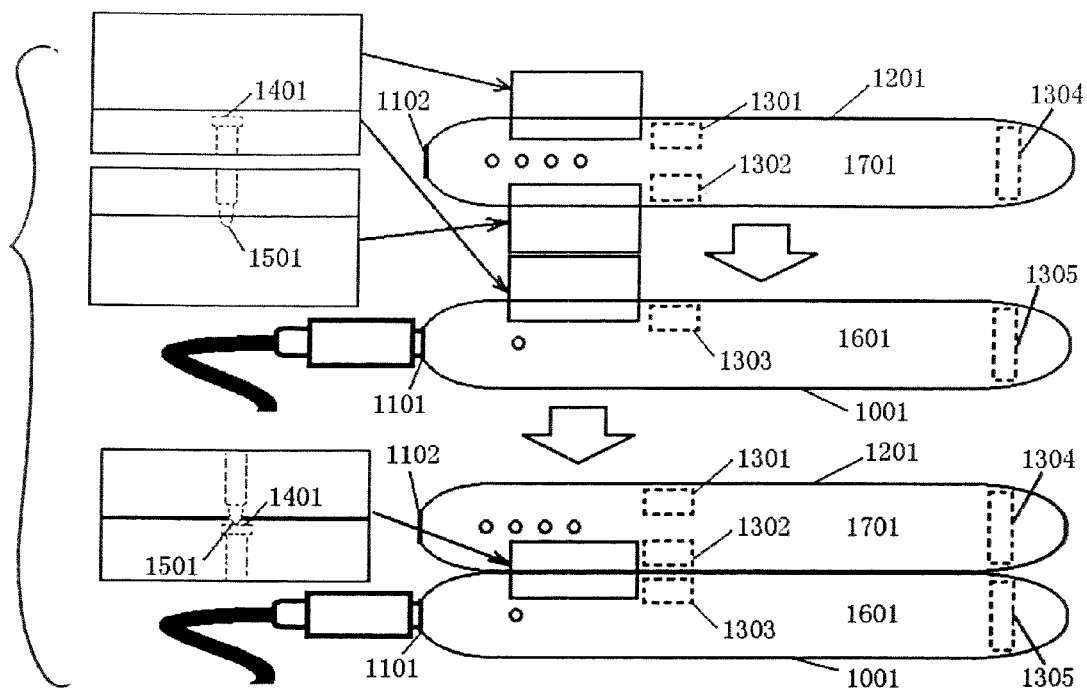
FIG. 1 is a schematic diagram of a standby battery product using a charging socket and a stackable charging system according to a first embodiment of the present invention.

FIG. 1 illustrates a standby battery product 1701 using a charging socket 1601 within a stackable charging system according to a first embodiment of the present invention. FIG. 1 is divided into an upper part and a lower part by a middle arrow, in which the part above the arrow illustrates the standby battery product 1601 before stacking, and the part below the arrow illustrates the standby battery product 1601 being stacked or coupled to the charging socket 1701.

Figure 4:
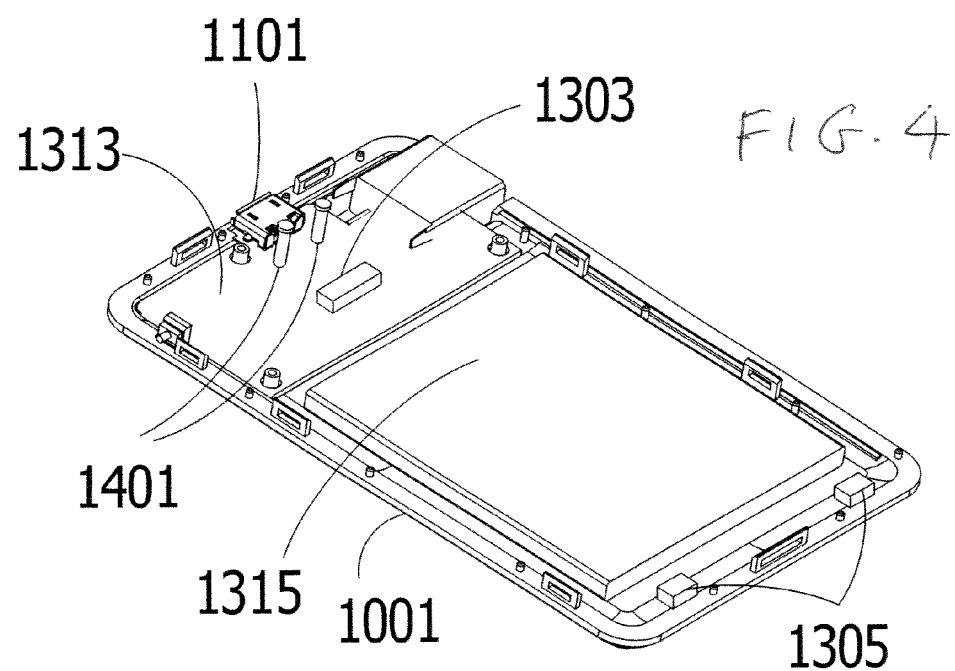
FIG. 4 is a perspective view of the charging socket according to the second embodiment hereof.

Referring to FIGS. 1 and 4, the charging socket 1601 comprises a casing 1001 having a thin rectangular shape with rounded corners. Magnets 1303 and 1305, at least one conductive contact 1401, and a power input interface 1101 are all disposed inside the casing 1001 at the locations shown in FIGS. 1 and 4. The upper surface and the lower surface of the casing 1001 are generally parallel. The conductive contact(s) 1401 are disposed adjacent to an upper part of the casing 1001 and oriented in a direction perpendicular to the upper surface of the casing 1001. The power input interface 1101 is disposed on one side of a short edge of the casing 1001 and is electrically connected to the conductive contact 1401 via a PCB 1313. The magnet(s) 1305 is disposed on the other side of the short edge of the casing 1001 and opposite to the power input interface 1101. The magnet 1303 is disposed on the PCB 1313 adjacent to the upper surface of the charging socket 1601. The power input interface 1101 is supplied with power from an external cable through an interface, such as USB interface, to provide power for the purpose of charging the standby battery product 1701 and the stackable charging system. A balancing weight 1315 can be provided in the casing 1001.

Figure 5:
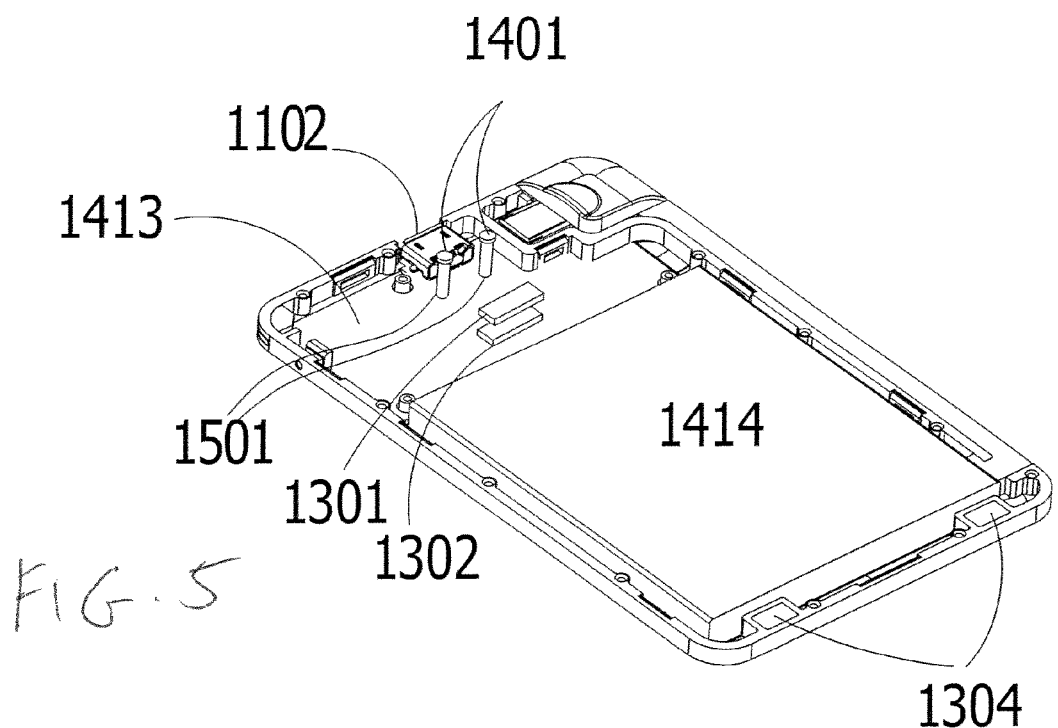
FIG. 5 is a perspective view of the standby battery product according to the second embodiment hereof.

Referring to FIGS. 1 and 5, a standby battery product 1701 comprises a casing 1201 that also has a thin rectangular shape with rounded corners. Magnets 1301, 1302 and 1304, an electricity storage unit 1414, at least one conductive elastic pin 1501, at least one conductive contact 1401, and a power input interface 1102 are all disposed inside the casing 1201. The upper surface and the lower surface of the casing 1201 are generally parallel. The electricity storage unit 1414 is used for storing electric energy and can be made of lithium battery cells or rechargeable battery cells. The conductive contact(s) 1401 of the standby battery product 1701 has the same structure as the conductive contact 1401 of the charging socket 1601, and are disposed adjacent to an upper part of the casing 1201 and oriented in a direction perpendicular to the upper surface of the casing 1201. Each conductive elastic pin 1501 corresponds to a conductive contact 1401 and is disposed adjacent to the lower part of the casing 1201 and oriented in a direction perpendicular to the lower surface of the casing 1201. The conductive contact(s) 1401 and the conductive elastic pin(s) 1501 are aligned in longitudinal and linear directions, and are electrically connected to each other to allow electric charge to pass therethrough. The power input interface 1102 is disposed on one side of a short edge of the casing 1201 and is electrically connected to the conductive contact 1401 via a PCB 1413. The magnet(s) 1304 is disposed on the other side of the short edge of the casing 1201 and opposite to the power input interface 1102. There can be two magnets 1304 to correspond to the two magnets 1305 on the charging socket 1601. The magnet 1303 is disposed on the PCB 1313 adjacent to the upper surface of the standby battery product 1701. The electricity storage unit 1414 is disposed inside an open space in the casing 1201, and the position thereof may be determined based on the specific application requirements or ornamental design of the standby battery product 1701.

The power input interface 1101 and the power input interface 1102 are disposed in longitudinal and parallel directions. The conductive contact 1401 of the charging socket 1601 and the conductive elastic pin 1501 and conductive contact 1401 of the standby battery product 1701 are also aligned in a longitudinal and linear directions. The magnets 1301, 1302 and 1303 are all also aligned in longitudinal and linear directions with each other. The magnets 1304 and 1305 are aligned in longitudinal and linear directions. The magnetic poles of the magnets 1302 and 1303 are opposite in magnetic attraction; in other words, in counterpoint attraction. The magnetic poles of the magnets 1304 and 1305 are also opposite in magnetic attraction. A group consisting of the magnet 1301, the magnet 1302 and the magnet 1303 will not interfere with a group consisting of the magnet 1304 and the magnet 1305 in a horizontal direction.

As shown in the upper part of FIG. 1, the arrow between the charging socket 1601 and the standby battery product 1701 shows that the standby battery product 1701 is stacked on the charging socket 1601. When stacked in this manner, the standby battery product 1701 and the charging socket 1601 have shapes in concave-convex alignment in the direction towards each other; for example, the shapes in concave-convex alignment between the aligned conductive contact(s) 1401 and the conductive elastic pin(s) 1501.

Figure 6:
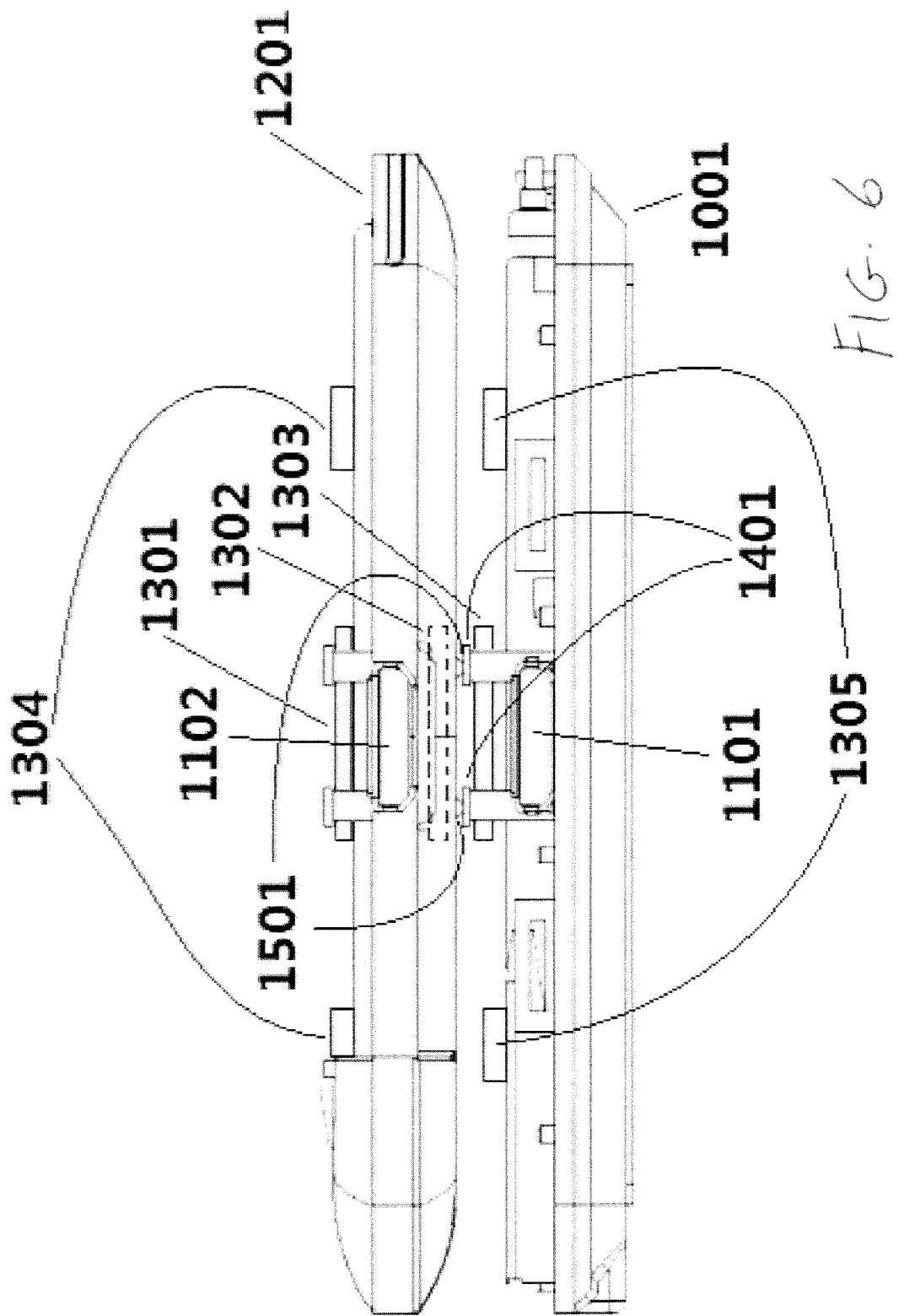
FIG. 6 is a side view of the multi-layer stackable charging system using a charging socket according to the second embodiment hereof.

As shown in the lower part of FIG. 1 and in FIG. 6, the aligned conductive contact(s) 1401 and the conductive elastic pin(s) 1501 respectively disposed inside the stacked charging socket 1601 and standby battery product 1701 automatically provide conductive contact by using the attraction forces (actually, counterpoint attraction, in which two magnets are disposed in the corresponding structural positions in the stacking direction such as in longitudinal direction, and represent the magnetic effect of the mutual attraction being larger than the mutual repulsion) of the magnets 1301, 1302 and 1303, and the attraction forces (actually, counterpoint attraction) of the magnets 1304 and 1305 between the charging socket 1601 and the standby battery product 1701, and the aligned shapes in the concave-convex alignment of the charging socket 1601 and the standby battery product 1701. In this way, when the external power supply provides power to the power input interface 1101 through a cable, in order to cause the standby battery product 1701 to be charged, the electricity energy is transmitted to the conductive contact(s) 1401 of the charging socket 1601 from the power input interface 1101, then to the aligned conductive elastic pin(s) 1501 of the standby battery product 1701 through the conductive contact, then to the conductive contact(s) 1401 of the standby battery product 1701, and finally to the electricity storage unit 1414 of the standby battery product 1701. Because the charging socket 1601 and the standby battery product 1701 are stacked together, the standby battery product 1701 can be charged without the need for it to be directly connected to the external power supply. Once the standby battery product 1701 is stacked on the charging socket 1601, the charging is started. The charging is stopped (completed or partially charged) when the standby battery product 1701 is removed from the charging socket 1601. The display of the charging states (e.g., comprising the information of whether the standby battery product is being charged, whether the charging is completed, and whether the standby battery product has the charging power, etc.,) can be achieved by means such as state indicator lamps on each of the charging socket 1601 and the standby battery product 1701.

Figure 2:
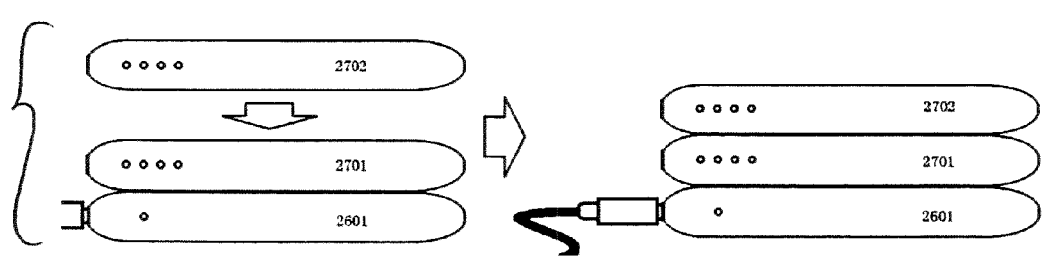
FIG. 2 illustrates a multi-layer stackable charging system using a charging socket according to a second embodiment of the present invention.

FIG. 2 illustrates a second embodiment of the present invention. The difference between the second embodiment and the first embodiment above is that there are two standby battery products 2701 and 2702 stacked on the charging socket 2601. The standby battery products 2701 and 2702 in FIG. 2 are identical to the standby battery product 1701 in the first embodiment, but are labeled using different numerals. Similarly, the charging socket 2601 is identical to the charging socket 1601. The charging operation would be identical to the first embodiment above. For the stacking between the standby battery product 2702 and the standby battery product 2701, the standby battery product 2701 and the standby battery product 2702 also have a concave-convex alignment to allow for a similar alignment between the conductive contact(s) 1401 and the conductive elastic pin(s) 1501. The magnets inside each of the standby battery product 2701 and the standby battery product 2702 are respectively also in counterpoint arrangement in the direction towards the mutual stacking of the two standby battery products 2701 and 2702 so as to be in mutual attraction in the direction towards the mutual stacking (i.e., counterpoint attraction, where at least one pair of magnets is in counterpoint attraction in the direction towards the mutual stacking).

In FIG. 2, a conductive elastic pin and a conductive contact inside the standby battery product 2701 and a conductive elastic pin and a conductive contact inside the standby battery product 2702 form an electrical connection when the standby battery product 2702 is stacked on top of the standby battery product 2701 using the attraction of the magnets in counterpoint attraction and setting shapes in concave-convex alignment. The two pairs of magnets in mutual attraction are formed by respective magnets of the standby battery product 2701 and the standby battery product 2702 in the direction towards the mutual stacking. The power transmitted to the conductive contact of the standby battery product 2701 from the external part through the charging socket is not only used for charging the electricity storage unit inside the standby battery product 2701, but is also transmitted to the conductive contact of the standby battery product 2702 through the conductive elastic pin of the standby battery product 2702 to charge the electricity storage unit inside the standby battery product 2702. As a result, the charging operation is started merely by stacking the standby battery product 2701 on the charging socket 2601, and by stacking the standby battery product 2702 on the standby battery product 2701, without the need to plug or unplug any connections between the charging socket and any of the standby battery products. After the charging is completed, the standby battery products 2701/2702 that need to be charged are taken away from the charging socket 2602.

Figure 3:
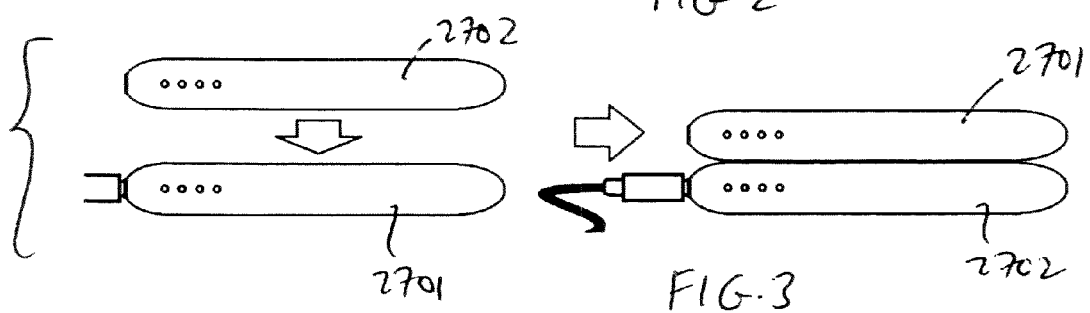
FIG. 3 illustrates a stackable charging system by fully using charging standby battery products for stackable charging according to a third embodiment of the present invention.

FIG. 3 illustrates a third embodiment of the present invention. The difference between the third embodiment and the second embodiment above is that the charging socket 2601 is removed to enable the external power supply to transmit power directly among multiple standby battery products 2701/2702 stacked together through the power input interfaces of the standby battery products 2701 and 2702, in order to charge the electricity storage unit inside each standby battery product 2701, 2702. In this embodiment, the external power supply can be coupled to the power input interface (i.e., same as 1102) of the standby battery product 2701, and the power would be used to charge both the standby battery products 2701/2702, as well as any other standby battery products that may be stacked on top of the standby battery product 2702.

Even though the drawings herein show that the conductive elastic pins 1501 and conductive contacts 1401 are oriented in a certain direction, the directions and locations of the conductive elastic pins 1501 and the conductive contacts 1401 can be reversed. In addition, the number of, and the electric parameters of, the conductive elastic pins 1501 and the conductive contacts 1401 are determined depending on the number of, and the charging current of, the standby battery products 1701 to be stacked and charged. In this way, by simply adjusting the number of, and the electric properties of, the elastic pins 1501 and the contacts 1401, the requisite requirements of supplying different charging currents or stacking additional standby batteries for charging can be met.

In addition, the charging voltage required by the stackable charging system can be derived from any one of the above power input interfaces 1101 and 1102; in other words, because the power input interface 1101 inside the charging socket 1601 and the power input interface 1102 of the standby battery products 1701 have the power with the same electric parameters at input and output, the power supply for charging the entire stackable charging system can be supplied simply by leading the external power supply into any one of the power input interfaces 1101, 1102 during the stacking.

The conductive elastic pins 1501 are metal elastic pins. The charging mode of the standby battery product 1701 in each embodiment not only can be the stackable charging of multiple standby battery products 1701, or of one or more standby batteries on the charging socket 1601, but the charging can be accomplished by directing the external power supply from a power input interface 1102 of a standby battery product 1701 itself, and then transmitting the power to an electricity storage unit 1414 inside the standby battery product 1701 through the conductive elastic pin 1501 and the conductive contact 1401 inside the standby battery product without stacking the charging socket 1601 or other standby battery products 1701 to the standby battery product 1701 that is being charged.

In addition, the charging socket 1601 can be configured to provide better charging protection than the standby battery product 1701, such as by providing temperature detection and accurate over-voltage protection. The charging system of the present invention can also include other features that are well-known in the art, such as power control, charging allowance control, power indication, charging state, charging progress indication, and the thermal design. Also, instead of magnets, other known couplers (e.g., latches, clips, etc.) can be used to couple the battery products 1701 on top of each other, or the charging socket 1601) in a stacking arrangement.

The present invention provides the following advantages.

1. The standby battery product to be charged is not required to be plugged in or pulled out at the beginning or at the end of charging.

2. Once the standby battery product to be charged is stacked on the charging socket 1601 or on another standby battery product 1701, the charging is started.

3. Once the standby battery product 1701 to be charged is taken away from the charging socket 1601, the charging is completed.

4. The stackable charging for the product is achieved by continuously stacking battery products 1701 of the same design on an existing standby battery product 1701 to be charged.

5. Simply by adjusting the number of, and the electric properties of the elastic pins 1501 and the contacts 1401, the requirements of supplying different charging currents or stacking additional standby batteries for charging can be met.

While the description above refers to particular embodiments of the present invention, it will be understood that many modifications may be made without departing from the spirit thereof. The accompanying claims are intended to cover such modifications as would fall within the true scope and spirit of the present invention. For example, the arrangement and improvement to the number of the conductive contacts 1401 and the conductive elastic pins 1501, and the specific aligned positions thereof, and other alignment designs such as non-concave-convex alignment to the shape counterpoint, are all encompassed herein.

What is claimed is:

1. An electrical charging system, comprising:
a first standby battery product having a first battery casing with a first electricity storage unit housed inside the first battery casing, the first battery casing further including a first power input interface on the first battery casing, a first elastic conductive pin and a first conductive contact, the first elastic conductive pin and first conductive contact being electrically connected to the first electricity storage unit and the first power input interface, the first battery casing further including a plurality of first couplers;
a second standby battery product having a second battery casing with a second electricity storage unit housed inside the second battery casing, the second battery casing further including a second power input interface on the second battery casing, a second elastic conductive pin and a second conductive contact, the second conductive elastic pin and second conductive contact being electrically connected to the second electricity storage unit and the second power input interface, the second battery casing further including a plurality of second couplers;
wherein the second elastic conductive pin is aligned with, and contacts, the first elastic conductive contact, and the first couplers engage the second couplers, when the second battery casing is placed on top of the first battery casing; and
wherein the first and second standby battery products are identical to each other;
wherein the first couplers are first magnets, and the second couplers are second magnets oriented at a different polarity from the first magnets; and
wherein a first charging path is defined by the first power input interface of the first battery casing and the first electricity storage unit, and a second charging path is defined by the first power input interface of the first battery casing, the first conductive contact of the first battery casing, the second elastic conductive pin of the second battery casing, and the second electricity storage unit of the battery product.

2. The system of claim 1, wherein the first and second standby battery products function to supply power to other digital products comprising at least mobile phones, digital cameras, and hand-held computing devices.

* * * * *